United States Patent
Wang et al.

(10) Patent No.: US 12,051,935 B2
(45) Date of Patent: Jul. 30, 2024

(54) CONTROL AND DIAGNOSIS OF CHARGING SYSTEM FOR A VEHICLE

(71) Applicant: Ford Global Technologies, LLC, Dearborn, MI (US)

(72) Inventors: Rui Wang, Canton, MI (US); Yuan Zhang, Canton, MI (US); Patterson Kaduvinal Abraham, Dearborn, MI (US); Changjian Hu, Southgate, MI (US); Jeffrey R. Grimes, Phoenix, AZ (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 501 days.

(21) Appl. No.: 17/143,903

(22) Filed: Jan. 7, 2021

(65) Prior Publication Data

US 2022/0216718 A1    Jul. 7, 2022

(51) Int. Cl.
*H02J 7/00* (2006.01)
*H01M 10/44* (2006.01)

(52) U.S. Cl.
CPC ......... *H02J 7/00716* (2020.01); *H01M 10/44* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 9,156,356 B2 | 10/2015 | Rini et al. | |
| 2011/0006731 A1* | 1/2011 | Wang | H02J 7/04 320/109 |
| 2012/0105065 A1 | 5/2012 | Namou et al. | |
| 2015/0032313 A1 | 1/2015 | Bai | |

* cited by examiner

*Primary Examiner* — Arun C Williams
(74) *Attorney, Agent, or Firm* — David B. Kelley; Brooks Kushman P.C.

(57) ABSTRACT

A controller, during charging of a traction battery by a remote charger, and responsive to a difference between a requested charge current and a current supplied by the remote charger exceeding a first threshold value for a predefined period of time, increases a requested charge voltage to a limit value. The controller further, responsive to a voltage across a capacitor and a voltage across the traction battery being same, and a voltage of the remote charger and the limit value being same, commands the remote charger to discontinue the charging.

20 Claims, 3 Drawing Sheets

CONTROL AND DIAGNOSIS OF CHARGING SYSTEM FOR A VEHICLE

TECHNICAL FIELD

This disclosure relates to detecting contactor faults within charging systems for automotive vehicles.

BACKGROUND

Vehicles that include traction batteries may be charged via charging stations that plug in to the vehicles. Contactors facilitating electrical connections between the vehicles and charging stations may open unintentionally.

SUMMARY

A method for controlling a charger remote from a vehicle, including a traction battery, a capacitor, and main contactors electrically between the traction battery and capacitor, includes increasing a requested charge voltage from the charger to a limit value, and responsive to a voltage across the capacitor, a voltage of the charger, and the limit value being same, commanding the charger to discontinue charging of the traction battery.

A control system for a vehicle, including a traction battery, a capacitor, and main contactors, includes a controller that requests an increase in charge voltage from a charger remote from the vehicle to a limit value, and commands the charger to discontinue charging of the traction battery responsive to a voltage across the capacitor decreasing to zero following the request.

A vehicle high voltage power system includes a traction battery, a capacitor, main contactors electrically between the traction battery and capacitor, and a controller. The controller, during charging of the traction battery by a remote charger, and responsive to a difference between a requested charge current and a current supplied by the remote charger exceeding a first threshold value for a predefined period of time, and the current supplied by the remote charger being less than a second threshold for the predefined period of time, increases a requested charge voltage to a limit value. The controller further, responsive to a voltage across the capacitor and a voltage across the traction battery being same, and a voltage of the remote charger and the limit value being same, commands the remote charger to discontinue the charging.

DETAILED DESCRIPTION

It is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
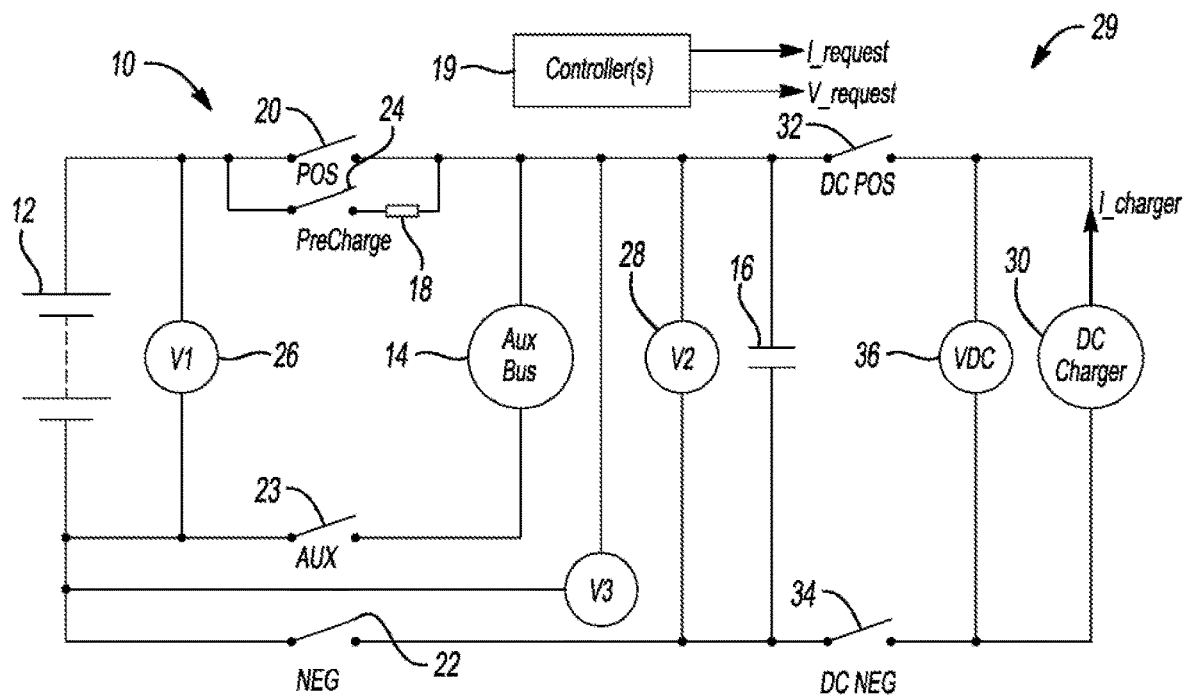
FIGS. 1 through 5 are schematic diagrams of vehicle power systems and charging systems therefor.

Referring to FIG. 1, a high voltage power system 10 of a vehicle includes a traction battery 12, an auxiliary bus 14 (which can include a DC/DC converter, an AC charger, etc.), a capacitor 16, and a pre-charge resistor 18. The system 10 also includes one or more controllers 19, main contactors 20, 22, an auxiliary contactor 23, a pre-charge contactor 24, and voltage sensors 26 (V1), 28 (V2). A charging system 29 for a vehicle includes a direct current (DC) charger 30, DC fast charge contactors 32, 34, and a voltage sensor 36 (VDC). The one or more controllers 19 are in communication with and/or command control of the various components of the systems 10, 29 via standard wired or wireless media.

In certain arrangements, the open/close status of the DC fast charge contactors 32, 34 can be determined by comparing the differences between V2 and VDC after pre-charging has finished and all the contactors 20, 22, 24, 32, 34 are closed. If $|V2-VDC|/V2 \times 100\% \leq X$ %, and V2≥threshold, it is considered that both the DC fast charge contactors 32, 34 are closed. "X" can be 3%, 5%, 10%, etc. (The check that V2 is greater than a threshold ensures the contactor status determination is valid.) Otherwise, at least one of the DC fast charge contactors 32, 34 is open.

The open/close status of the of main contactor 20 can be determined by comparing the difference between V1 and V2. If $|V1-V2|/V1 \times 100\% \leq X$ %, it is considered that both the main contactors 20, 22 are closed. Otherwise, at least one of the main contactors 20, 22 is open.

The open/close status of the main contactor 22 can also be determined by an internal measurement circuit, and uses V2 as backup (if $|V1-V2|/V1 \times 100\% \leq X$ %, the main contactor 22 is considered closed).

During DC charging, all of the contactors 20, 22, 24, 32, 34 are closed, and the controllers 19 may send out a charging current request (I_request) and voltage request (V_request). It is expected that $|V\_request-V1|/V1 \times 100\% \leq X$ %. Upon receiving the requests via standard wired or wireless communication techniques, the DC charger 30 will regulate its output to meet the voltage and current requests, respectively.

Once the system 10 enters the charging state and the DC charger 30 is regulating to meet the voltage request, several issues may arise. If one or both of the DC fast charge contactors 32, 34 opens during DC charging, this open fault may not be detected. The reason is likely due to VDC being effectively within ±X % of V2, which may also be close to the battery pack voltage V1, as the DC charger 30 regulates its output.

During charging, current requests may be sent to the DC charger 30 while keeping the voltage request close to the charge complete voltage. If the electric vehicle supply equipment associated with the DC charger 30 cannot meet the current request due to at least one of the DC fast charge contactors 32, 34 being open, it may raise the voltage until the voltage reaches the voltage request. If the state of charge of the traction battery 12 is high such that V1 is sufficiently high, when VDC reaches the charge complete voltage, it may still be within ±X % of V1 or V2. Again, the fault may not be detected and continued operation of the DC charger 30 may timeout after a predefined period (e.g., 5 minutes).

If the main contactors 20, 22 open during DC charging, the controllers 19 may not detect this fault for similar reasons.

If the above described open faults are permanent, eventually a fault code may be set due to the large mismatch between the charge current that the controllers 19 are requesting (which is a high value), and the actual current the DC charger 30 is outputting (which will be close to zero). In this case, the controllers 19 may set a fault code pointing to the electric vehicle supply equipment, as the controllers 19 cannot differentiate between the issue being off-board or on-board, and the first action may be to ask the customer to try different electric vehicle supply equipment.

After the customer tries different electric vehicle supply equipment, in certain circumstances, the controllers 19 may close the main contactors 20, 22 while keeping the DC fast charge contactors 32,34 open. The electric vehicle supply equipment will pre-charge the high voltage bus (VDC) while the controllers 19 pre-charge V2. When V2=VDC, the controllers 19 close the DC fast charge contactors 32, 34. In this case, an open one of the DC fast charge contactors 32, 34 cannot be detected.

In other circumstances, the controllers 19 may pre-charge the high voltage bus to the battery pack voltage: V2≈V1. While the controllers 19 are performing the pre-charge, they may "assume" the DC fast charge contactors 32, 34 to be already closed. Thus after the pre-charge, the controllers 19 may proceed to the charging state and start to send out charge current and voltage requests. In this case, if the electric vehicle supply equipment provides voltage equal to the battery charge voltage request within some predefined period (e.g., 3 seconds), the controllers 19 cannot detect whether any of the DC fast charge contactors 32,34 is open. Any resulting fault code may incorrectly point to the electric vehicle supply equipment.

If the above described open faults are intermittent (one of the contactors 20, 22, 32, 34 opens whenever the current or temperature exceeds a threshold), such issues may not be properly detected, even during subsequent power cycles.

Given the above, strategies are proposed to detect various open faults associated with the contactors 20, 22, 32, 34. Denote the battery charge current request as I_request, the charge voltage request as V_request and the current flowing out of the DC charger 30 as I_charger. During DC charging, if |I_request−I_charger|≥Threshold 1, and I_charger≤Threshold 2 for a predefined period of time, the controllers 19 may gradually increase V_request to an over-voltage limit threshold V_max. Threshold 1, Threshold 2, the predefined period of time, and V_max may be determined via simulation or testing depending on the particular architecture.

Then, the controllers 19 check the voltages and current using the following truth table to determine contactor status and set fault codes accordingly:

| V2 | VDC | Conclusion |
|---|---|---|
| ≈V1 | ≈V1 | No stuck open fault, and issue is within electric vehicle supply equipment |
| ≈V1 | ≈V_max | At least one of the DC fast charge contactors 32, 34 is open |
| ≈V_max | ≈V_max | V3 ≈ V1: the main contactor 22 is open |
| ≈V_max | ≈V_max | V3 ≈ V_max: the main contactor 20 is open |
| Keeps decreasing until it reaches 0 V | Any value | The main contactor 20 and the DC fast charge contactors 32, 34 are open |

Additionally, if V2≈V1, and |VDC−V2|/V2≥X %, at least one of the DC fast charge contactors 32, 34 is open. Likewise, if |V2−V1|/V1≥X %, and VDC has any value, the main contactor 22 and/or the main contactor 22 is open.

Any of the conclusions mentioned above may prompt the controllers 19 to command the DC charger 30 to discontinue any charging being performed. Also, fault codes indicative of the conclusions above may be set by the controllers 19 when the listed conditions are present.

The above strategies may be applied to topologies other than those of FIG. 1. FIGS. 2-5 are examples of such other topologies.

Figure 2:
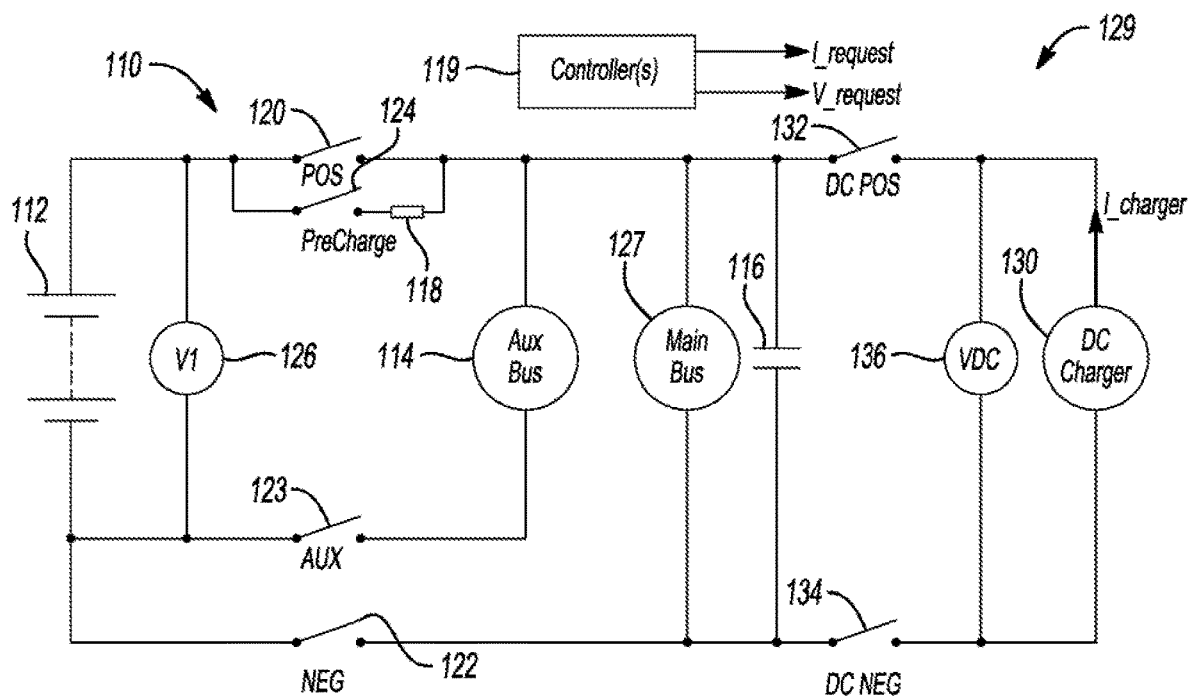

Referring to FIG. 2, a high voltage power system 110 of a vehicle includes a traction battery 112, an auxiliary bus 114, a capacitor 116, and a pre-charge resistor 118. The system 110 also includes one or more controllers 119, main contactors 120, 122, an auxiliary contactor 123, a pre-charge contactor 124, a voltage sensor 126 (V1), and a main bus 127. A charging system 129 for a vehicle includes a direct current (DC) charger 130, DC fast charge contactors 132, 134, and a voltage sensor 136 (VDC). The one or more controllers 119 are in communication with and/or command control of the various components of the systems 110, 129 via standard wired or wireless media.

Figure 3:
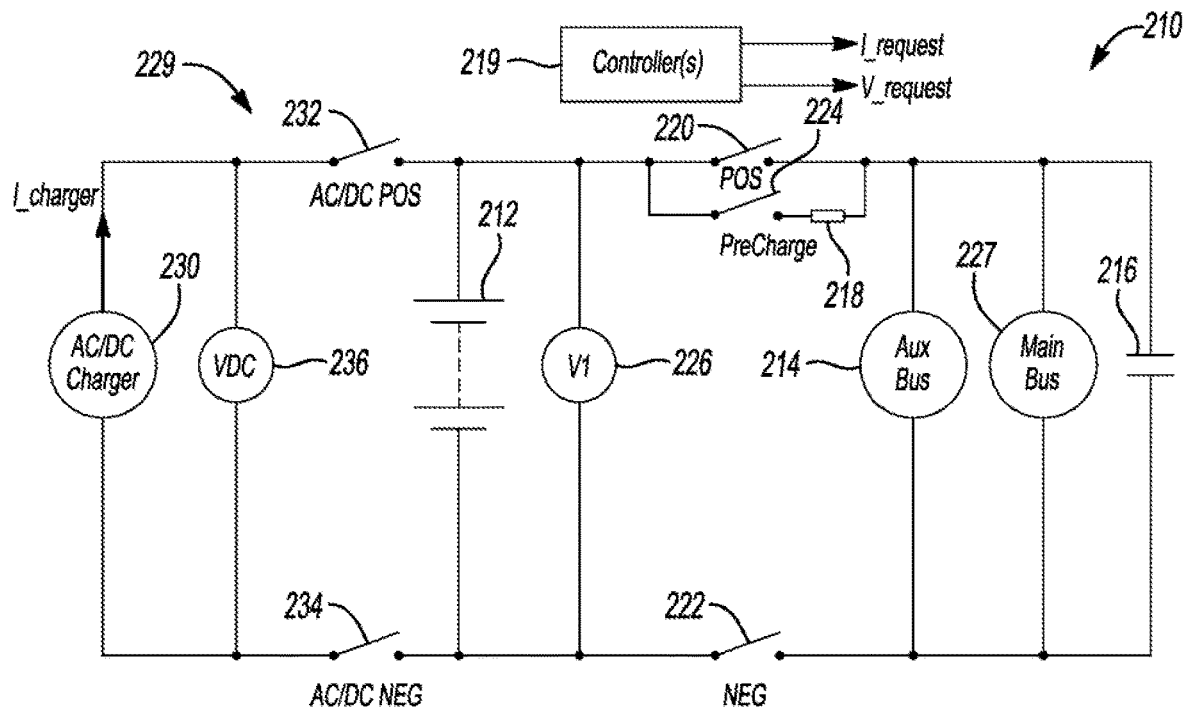

Referring to FIG. 3, a high voltage power system 210 of a vehicle includes a traction battery 212, an auxiliary bus 214, a capacitor 216, and a pre-charge resistor 218. The system 210 also includes one or more controllers 219, main contactors 220, 222, a pre-charge contactor 224, a voltage sensor 226 (V1), and a main bus 227. A charging system 229 for a vehicle includes an alternating current (AC)/direct current (DC) charger 230, DC fast charge contactors 232, 234, and a voltage sensor 236 (VDC). The one or more controllers 219 are in communication with and/or command control of the various components of the systems 210, 229 via standard wired or wireless media.

Figure 4:
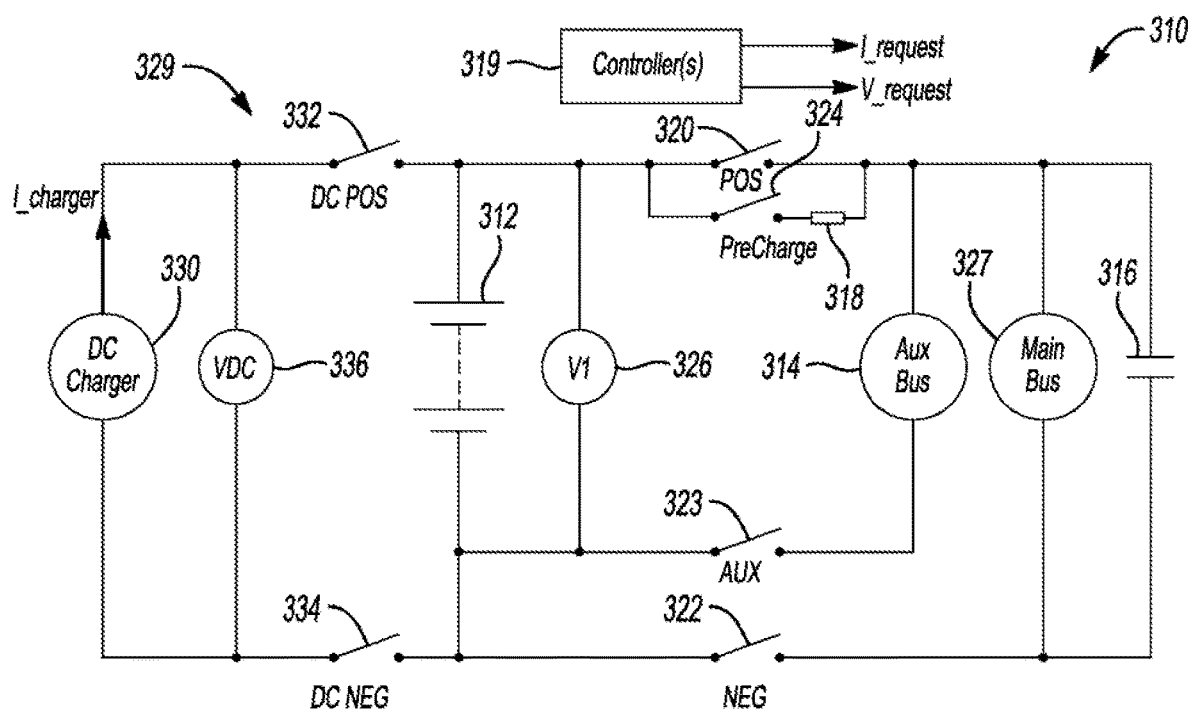

Referring to FIG. 4, a high voltage power system 310 of a vehicle includes a traction battery 312, an auxiliary bus 314, a capacitor 316, and a pre-charge resistor 318. The system 310 also includes one or more controllers 319, main contactors 320, 322, an auxiliary contactor 223, a pre-charge contactor 324, a voltage sensor 326 (V1), and a main bus 327. A charging system 329 for a vehicle includes a direct current (DC) charger 330, DC fast charge contactors 332, 334, and a voltage sensor 336 (VDC). The one or more controllers 319 are in communication with and/or command control of the various components of the systems 310, 329 via standard wired or wireless media.

Figure 5:
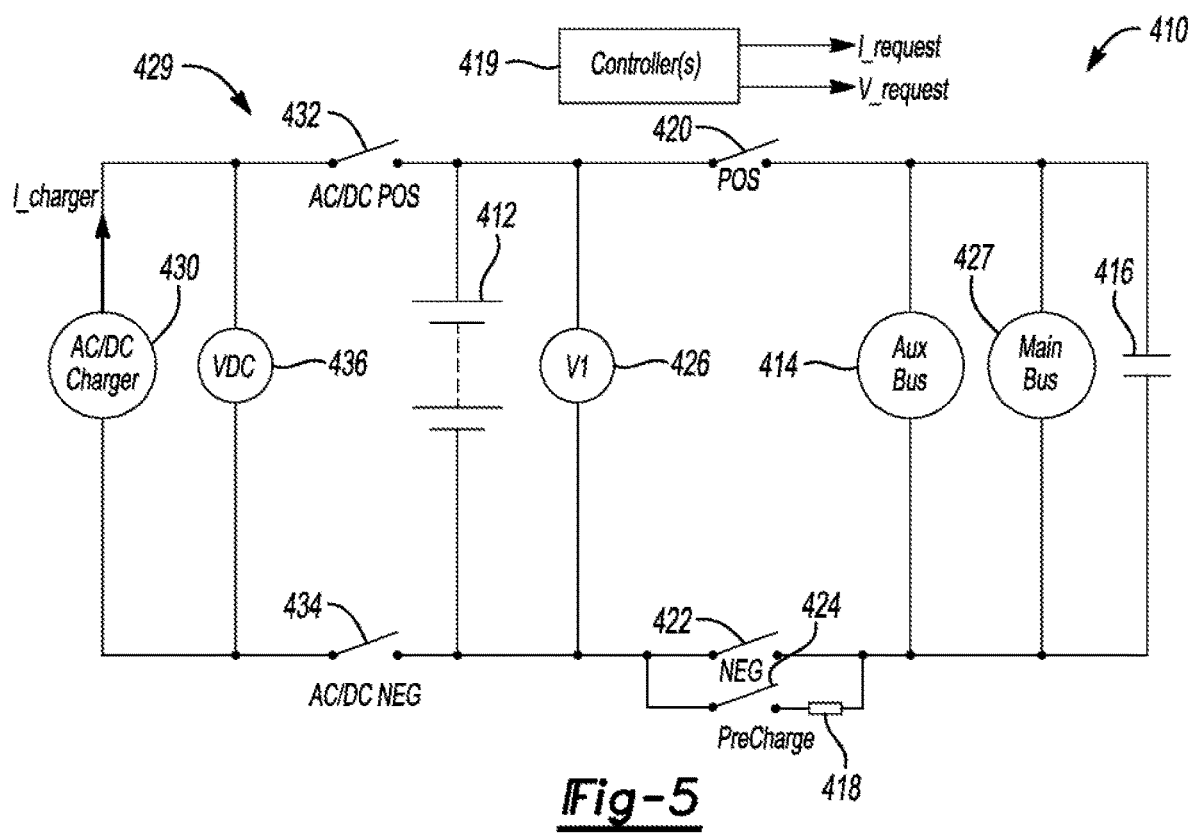

Referring to FIG. 5, a high voltage power system 410 of a vehicle includes a traction battery 412, an auxiliary bus 414, a capacitor 416, and a pre-charge resistor 418. The system 410 also includes one or more controllers 419, main contactors 420, 422, a pre-charge contactor 424, a voltage sensor 426 (V1), and a main bus 427. A charging system 429 for a vehicle includes an alternating current (AC)/direct current (DC) charger 430, DC fast charge contactors 432, 434, and a voltage sensor 436 (VDC). The one or more controllers 419 are in communication with and/or command control of the various components of the systems 410, 429 via standard wired or wireless media.

As suggested above, controllers, interfaces, modules, etc. described herein may communicate via one or more vehicle networks. The vehicle network may include a plurality of channels for communication. One channel of the vehicle network may be a serial bus such as a CAN. One of the channels of the vehicle network may include an Ethernet network defined by the Institute of Electrical and Electronics Engineers 802 family of standards. Additional channels of the vehicle network may include discrete connections between modules and may include power signals from an auxiliary battery. Different signals may be transferred over different channels of the vehicle network. For example, video signals may be transferred over a high-speed channel (e.g., Ethernet) while control signals may be transferred over CAN or discrete signals. The vehicle network may include any hardware and software components, wired or wireless, that aid in transferring signals and data between modules. The vehicle network may connect to any electronic module that is present or remote from the vehicle via a transceiver or the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. "Controllers" and "controller," for example, may be used interchangeably herein. Also, terms or symbols indicating "same," "about," or "approximately," signify that the value or relative characteristic it modifies is within ±0%, 0.1%, 0.5%, 1%, 2%, 3%, 4%, 5%, or 10% of the value or relative characteristic.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for controlling a charger remote from a vehicle including a traction battery, a capacitor, and main contactors electrically between the traction battery and capacitor, comprising:

increasing a requested charge voltage from the charger to a limit value; and responsive to a voltage across the capacitor, a voltage of the charger, and the limit value being same, commanding the charger to discontinue charging of the traction battery.

2. The method of claim 1 further comprising responsive to the voltage across the capacitor, the voltage of the charger, and the limit value being same, generating output indicating at least one of the main contactors is open.

3. The method of claim 1 further comprising responsive to the voltage across the capacitor and a voltage across the traction battery being same, and a voltage of the charger and the limit value being same, commanding the charger to discontinue the charging.

4. The method of claim 1, wherein the traction battery, capacitor, and main contactors define a power arrangement, further comprising responsive to the voltage across the capacitor and the voltage across the traction battery being same, and the voltage of the charger and the limit value being same, generating output indicating at least one contactor between the charger and power arrangement is open.

5. The method of claim 1 further comprising responsive to the voltage across the capacitor decreasing to zero, commanding the charger to discontinue the charging.

6. The method of claim 1, wherein the traction battery, capacitor, and main contactors define a power arrangement, further comprising responsive to the voltage across the capacitor decreasing to zero, generating output indicating at least one of the main contactors is open and at least one contactor between the charger and power arrangement is open.

7. The method of claim 1 further comprising, responsive to the voltage across the capacitor, the voltage of the charger, and the voltage of the traction battery being same, commanding the charger to discontinue the charging.

8. The method of claim 1 further comprising, responsive to the voltage across the capacitor, the voltage of the charger, and the voltage of the traction battery being same, generating output indicating an electric vehicle supply equipment fault.

9. A control system for a vehicle including a traction battery, a capacitor, and main contactors, comprising:

a controller programmed to request an increase in charge voltage from a charger remote from the vehicle to a limit value, and command the charger to discontinue charging of the traction battery responsive to a voltage across the capacitor decreasing to zero following the request.

10. The control system of claim 9, wherein the controller is further programmed to command the charger to discontinue the charging responsive to the voltage across the capacitor, a voltage of the charger, and the limit value being same.

11. The control system of claim 9, wherein the controller is further programmed to command the charger to discontinue the charging response to the voltage across the capacitor and a voltage across of the traction battery being same, and a voltage of the charger and the limit value being same.

12. A vehicle high voltage power system comprising:

a traction battery;

a capacitor;

main contactors electrically between the traction battery and capacitor; and a controller programmed to, during charging of the traction battery by a remote charger, and responsive to a difference between a requested charge current and a current supplied by the remote charger exceeding a first threshold value for a predefined period of time, and the current supplied by the remote charger being less than a second threshold for the predefined period of time, increase a requested charge voltage to a limit value, and responsive to a voltage across the capacitor and a voltage across the traction battery being same, and a voltage of the remote charger and the limit value being same, command the remote charger to discontinue the charging.

13. The vehicle high voltage power system of claim 12, wherein the traction battery, main contactors, and capacitor define a power arrangement and wherein the controller is further programmed to, responsive to the voltage across the capacitor and the voltage across the traction battery being same, and the voltage of the remote charger and the limit value being same, generate output indicating that at least one contactor electrically between the remote charger and power arrangement is open.

14. The vehicle high voltage power system of claim 12, wherein the controller is further programmed to, responsive to the voltage across the capacitor, the voltage of the remote charger, and the voltage across the traction battery being same, command the remote charger to discontinue the charging.

15. The vehicle high voltage power system of claim 12, wherein the controller is further programmed to, responsive to the voltage across the capacitor, the voltage of the remote charger, and the voltage across the traction battery being same, generate output indicating an electric vehicle supply equipment fault.

16. The vehicle high voltage power system of claim 12, wherein the controller is further programmed to, responsive to the voltage across the capacitor, the voltage of the remote charger, and the limit value being same, command the remote charger to discontinue the charging.

17. The vehicle high voltage power system of claim 12, wherein the controller is further programmed to, responsive to the voltage across the capacitor, the voltage of the remote charger, and the limit value being same, generate output indicating at least one of the main contactors is open.

18. The vehicle high voltage power system of claim 12, wherein the traction battery, main contactors, and capacitor define a power arrangement and wherein the controller is further programmed to, responsive to the voltage across the capacitor decreasing to zero, generate output indicating at least one of the main contactors is open and at least one contactor electrically between the remote charger and power arrangement is open.

19. The vehicle high voltage power system of claim 12, wherein the controller is further programmed to, responsive to the voltage across the capacitor decreasing to zero, command the remote charger to discontinue the charging.

20. The vehicle high voltage power system of claim 12, wherein the charging is direct current charging.

* * * * *